Figure 1:
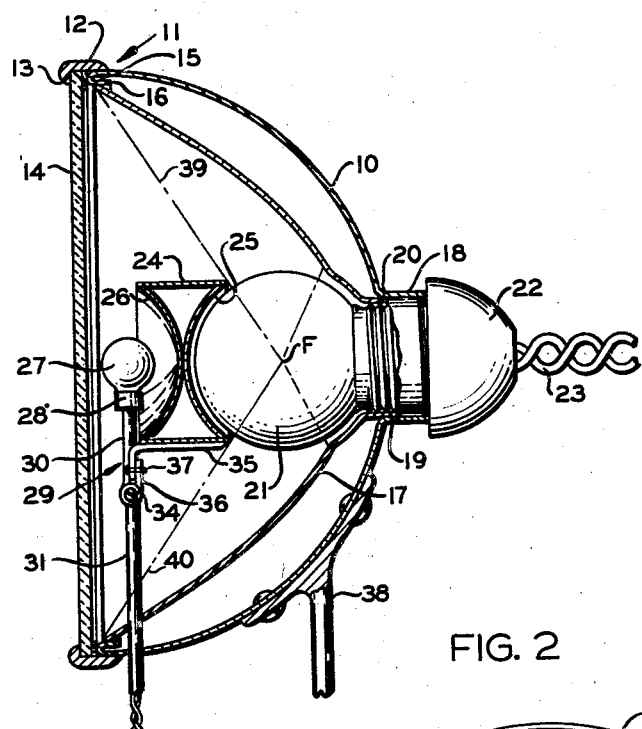
Figure 2:
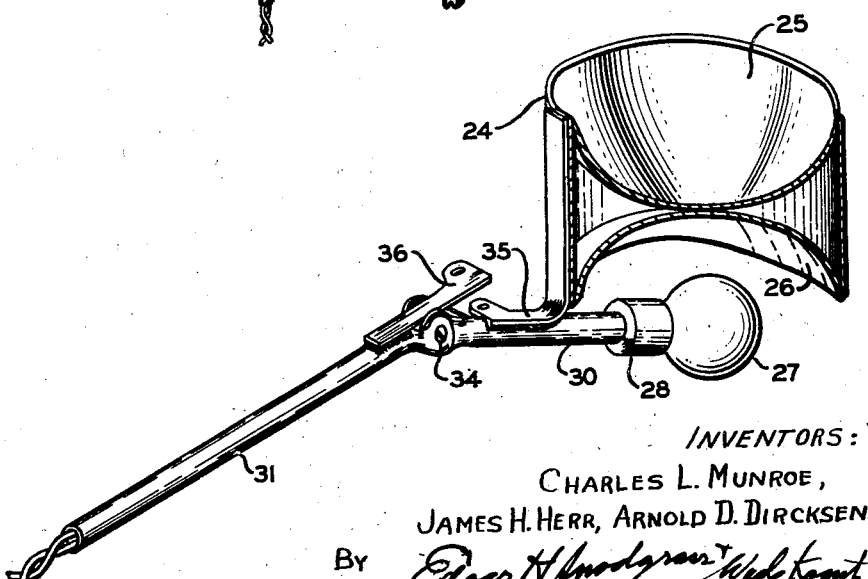

Patented June 23, 1942

2,287,051

UNITED STATES PATENT OFFICE 2,287,051

PACKING RING

Arden John Mummert, University City, Mo., assignor to McQuay-Norris Manufacturing Company, St. Louis, Mo., a corporation of Delaware Application January 6, 1940, Serial No. 312,772

3 Claims. (Cl. 309—45)

My invention relates to packing rings and more particularly to packing rings adapted for use on a piston or other similar part, so that an effective seal may be obtained between the piston and the cylinder in which it reciprocates.

It is a known fact that bodies under tension and exposed to a disturbing force will go into a flutter or tuned vibration if the disturbing force has approximately the same frequency as the natural vibration frequency of the body. This natural frequency of the body depends principally on the mass of the body and the tension under which the body is placed. Piston rings, adapted for use in internal combustion engines in particular, are likely to vibrate in this manner since they are under tension and exposed to a disturbing force which is capable of starting vibration. For instance, as a piston reciprocates in a cylinder, irregularities in the cylinder wall make the piston ring expand and contract and when the speed of the motor is such that the frequency of vibration produced by these irregularities is approximately the same as the natural frequency of the piston ring, it goes into a tuned vibration and the cylinder contacting face of the piston ring contacts the cylinder wall only periodically so that liquids and gases are permitted to flow past the piston. The packing ring, therefore, fails to produce an effective seal between the piston and the cylinder.

In the older type rings used heretofore, where only a single member was utilized to contact the cylinder wall, this vibration was very pronounced, particularly when the ring was used in a worn cylinder which had a somewhat irregular bore. An attempt was made to dampen the vibration of the ring member by connecting the ring member to the piston by an expander placed in the ring groove of the piston between the bottom thereof and the rear face of the ring member. However, since the expander was under tension and exposed to a disturbing force, the expander also had a natural frequency of vibration and frequently, at certain engine speeds, conditions were such that the ring and expander vibrated in harmony with each other and the ring, therefore, failed to provide an effective seal between the piston and the cylinder.

To further obviate this difficulty, packing rings comprised of a plurality of ring members were used, but with little success. Usually the ring members all were placed under the same tension, and they were all substantially the same mass, and, since the frequency of vibration of any body depends principally on its mass and the tension under which the member is placed, the natural frequency of all the ring members was the same. The members, therefore, all went into a flutter or tuned vibration simultaneously when subjected to a disturbing force, and an effective seal could not be obtained between the piston and the cylinder with this kind of structure.

In order to overcome the deficiencies of packing rings as used heretofore, my invention contemplates a ring comprising a pair or more of ring members each adapted to contact the wall of the cylinder in which the packing ring is used. One of the ring members has a mass substantially greater than the other members so that the periods of vibration of the ring members is unequal, and the members are connected by a ring expander so that vibration of one member will be damped by another member having a different natural frequency. The expander is adapted to exert substantially equal pressure on each of the ring members and is positioned in the ring groove between the bottom thereof and the rear faces of the members.

The ring members may have cylinder contacting faces of substantially equal area, and the ring expander may be arranged to engage substantially equal areas on the rear faces of the members.

It is a known fact, also, that when equal forces are exerted on two bodies of unequal mass, the body of lesser mass will respond more quickly thereto and will change its position more readily than will the body of greater mass. For this reason, the ring member of greater mass follows only the larger or more pronounced irregularities in the cylinder wall and the ring member of lesser mass follows both the smaller irregularities and the more pronounced ones. The frequency of the disturbing force for the ring member of lesser mass, therefore, is different than the frequency of the disturbing force of the ring member of greater mass, and for this reason, the ring members, either alone or with the expander, cannot go into a uniform flutter or tuned vibration as the piston on which they are used reciprocates in the cylinder. Also, a ring member of one mass and frequency tends to damp out vibration of another ring member of the packing structure, and conditions are such that the ring members and expander cannot vibrate in harmony with each other.

Having thus briefly described my invention one object thereof is to provide a packing ring which will not go into a flutter or tuned vibrathan said member, and a ring expander positioned between the bottom of the ring groove and said ring members and adapted to engage said rib on said wide member and to engage the rear face of said narrow member to exert radial pressure on each of said members said rib on said wide member being arranged to engage said expander remote from the medial portion of said expander.

2. A packing ring comprising a plurality of ring members adapted to contact the wall of the cylinder in which said packing ring is used, a pair of said members being narrow as compared to their radial thickness, another of said ring members being substantially wide and being positioned between said narrow ring members to space said members from each other, said wide member having formed on the rear face thereof a rib of less width than said member, a ring expander positioned between the bottom of the ring groove and said ring members and adapted to engage the rear faces of said narrow ring members and the rib on said wide ring member to exert radial pressure on each of said ring members said rib on said wide member being arranged to engage said expander remote from the medial portion of said expander.

3. A packing ring comprising a pair of ring members positioned side by side in the ring groove of a piston and adapted to contact the wall of the cylinder in which said packing ring is used, one of said members being narrow as compared to its radial thickness, the other member being substantially wide and having formed on the front and rear faces thereof circumferential ribs of less width than said member and located adjacent the side faces of said member remote from said narrow member, and a ring expander positioned between the bottom of the ring groove and said ring members and adapted to engage the rear face of said narrow member and the rib of the rear face of said wide member to exert radial pressure on each of said members.

ARDEN JOHN MUMMERT.

June 23, 1942.   C. L. MUNROE ET AL   2,287,052
AIRCRAFT PASSING AND LANDING LAMP
Filed Sept. 26, 1940

INVENTORS:
CHARLES L. MUNROE,
JAMES H. HERR, ARNOLD D. DIRCKSEN.
BY
ATTORNEYS.